United States Patent [19]

Rodgers

[11] Patent Number: 5,505,390
[45] Date of Patent: Apr. 9, 1996

[54] TWO STAGE HAMMER MILL WITH PARTICLE SEPARATOR

[76] Inventor: Charles C. Rodgers, P.O. Box 206, Baker City, Oreg. 97814

[21] Appl. No.: 261,158

[22] Filed: Jun. 17, 1994

[51] Int. Cl.$^6$ .................. B02C 13/06; B02C 13/284; B02C 23/12; B02C 23/22
[52] U.S. Cl. .................. 241/48; 241/52; 241/61; 241/69; 241/78; 241/80; 241/99; 241/152.2; 241/189.1
[58] Field of Search ............... 241/48, 52, 60, 241/61, 69, 77, 78, 79, 79.1, 80, 99, 152.2, 189.1, 243, 285.3, DIG. 14

[56] References Cited

U.S. PATENT DOCUMENTS

| 59,165 | 10/1866 | Battell | 241/78 |
|---|---|---|---|
| 672,833 | 4/1901 | Scheirer | 241/79.1 X |
| 1,320,968 | 11/1919 | Baudendistel | 241/79.1 X |
| 3,004,721 | 10/1961 | Nötzold | 241/79.1 X |
| 3,472,379 | 10/1969 | Lainas et al. | 241/79.1 X |
| 4,586,658 | 5/1986 | Eisenegger | 241/61 X |
| 4,618,415 | 10/1986 | Vecchio et al. | 241/79.1 X |

FOREIGN PATENT DOCUMENTS 294191  9/1991  Germany ............... 241/79.1

*Primary Examiner*—Timothy V. Eley
*Attorney, Agent, or Firm*—Frank J. Dykas

[57] ABSTRACT

A two stage hammer mill which reduces recycled glass and its associated contaminants to small glass particles in the 100–800 grit size range and waste. The glass grinder is of light weight, modular construction, such that it may be taken apart, relocated, and restored to operation quickly and easily. A modular design also allows it to be easily cleaned and reconfigured to produce aggregate of selectable size. Located on separate rotors, installed in separate grinding chambers, the two hammer mills are spaced apart from one another and mounted within a common housing. The first stage provides a relatively coarse reduction of the material flow, which then passes into the secondary grinding chamber where the material is further ground. The design of the hammers in this hammer mill are such that they entrain a large quantity of air, accelerate it to high velocity, and drive the mixture of air and material through the system, entraining small, medium and large sized particles. Vacuum pressure is utilized to enhance particle flow through the system and to provide for more precise separation of the finished product as well as separating contaminants from the ground glass. A shaker screen is also employed to facilitate the separation process. Paper shredders are utilized to enhance paper removal.

6 Claims, 7 Drawing Sheets

TWO STAGE HAMMER MILL WITH PARTICLE SEPARATOR

BACKGROUND OF THE INVENTION

1. Technical Field

This invention relates to a hammer mill for processing recycled glass provided with two separate grinding stages operating simultaneously on dissimilar rotors with an improved separation loop utilizing vacuum pressure and paper shredders for enhanced particle flow and separation resulting in improved product.

2. Background

Single stage hammer mills are well known. In hammer mills, the product to be ground is subjected to flailing motion from a large number of hammers or blades carried on a central rotor. A major drawback in such mills is the imprecise control over the grinding process. Another major drawback is the inability of hammer mills to remove the paper from the final product.

Typically in single stage hammer mills, in order to obtain finely ground product, it is necessary to employ finely meshed screens. Screens, particularly those employing fine meshes, have several drawbacks. One drawback is that screens slow the rate of material flow, reducing throughput. Another drawback is that fine mesh screens are susceptible to clogging from foreign materials and particles, particularly paper.

Hammer mill systems in general are often incapable or highly inefficient at producing both fine and coarsely-ground materials. As a result, different machines must be used to grind different coarsenesses. Thus, these machines tend to be specialized and do not perform efficiently across wide ranges of grinding coarsenesses.

Another drawback of both single stage and double stage hammer mills which affects the rate of flow through the machine is air flow. Typically, finely-ground material must be entrained in an air flow stream and exhibits a tendency to pile up in corners and "dead spots" within the system. The problem of maintaining high velocity flow in a system incorporating fine mesh screens has been one which has eluded the prior art.

Another drawback of single and double stage hammer mills is the relatively poor control over aggregate particle sizes produced. Typically in the case of a double stage hammer mill, raw material makes one pass through the hammer mill, receiving a coarse grinding followed by a fine grinding and is then separated. In a single stage hammer mill, material typically makes one pass through the system, receiving only a coarse grinding. Such systems provide for very poor control over the aggregate product size. Thus, typical single stage and double stage hammer mills are inefficient at producing specific aggregate output size and must be designed with limited ranges in mind. What is needed is a hammer mill which is capable of controllably producing product within tighter grit ranges over a wider range of aggregate sizes which may be easily reconfigured to produce different aggregate sizes.

Efficiency is another drawback to single and double stage hammer mills. Single and double stage hammer mills of the prior art typically have minimal control over aggregate output size, and thus are highly inefficient at producing quantities of specific aggregate product size. What is needed is a hammer mill that is capable of producing specific aggregate output size that is controllable over finite ranges which may also be easily reconfigured to efficiently produce different aggregate particle sizes.

It is an objective of the present invention to overcome these various disadvantages and to provide other advantages in a hammer mill having two stages consisting of a coarse-grind followed by a fine grind. It is another objective of the present invention to provide a dual hammer mill system which is capable of operating continuously and automatically conveying the semi-ground and ground product from the first stage to the second stage, then through a separation loop and into collection containers. It is a further objective to provide in such a continuous system for greater throughput and tighter control over aggregate product size.

A further objective of the invention is to provide a two stage hammer mill wherein the semi-ground product is moved from the first stage to the second stage and through the separation loop by a combination of gravity and pneumatic pressure.

A further objective of the invention is to provide a two stage hammer mill in which the second stage is capable of producing sufficient air velocity to continually draw material through the first stage and entrain the semi-ground product, which is then introduced into the second stage hammer mill for continuous grinding until it is drawn through adjustable gate means which regulate material flow to the separation loop. More particularly, it is an objective of the present invention to provide a two stage hammer mill having the foregoing advantages and in which the semi-ground product exiting from the second stage hammer mill is controllably drawn into a separation loop for more precise control over the aggregate particle size of the finished product. It is a further objective to provide such a separation loop utilizing vacuum pressure means for removing paper, dust, and other fine materials and collecting them as waste, while reducing the overall dust level associated with such a device. A further objective is to increase through put by providing a removable shaker screen for easily removing cloggages.

It is a further objective of the present invention to provide a two stage hammer mill having the foregoing advantages which is particularly adapted for precise control over the ground product size, and in such a system whereby precise control over product size can be easily changed.

SUMMARY OF THE INVENTION

These objects, and others, are accomplished by a glass grinder having two hammer mills, located on separate rotors, installed in separate grinding chambers, which are spaced apart from one another and mounted within a common housing. The first stage provides a relatively coarse reduction of the material flow, which then passes into the secondary grinding chamber where the material is further ground. The design of the hammers in this hammer mill are such that they entrain a large quantity of air, accelerate it to high velocity, and drive the mixture of air and material through the system, entraining small, medium and large sized particles. An important aspect of the present invention is that it utilizes paper shredders and vacuum pressure to enhance particle flow through the system and to provide for more precise separation of the finished product.

This dual hammer mill system is capable of operating continuously and automatically conveying the semi-ground and ground product from the first stage to the second stage, then through the separation loop and into collection containers in order to provide a continuous system for greater throughput and tighter control over aggregate product size.

The second stage hammer mill is capable of producing sufficient air velocity to continually draw material through the first stage and entrain the semi-ground product, which is then introduced into the second stage hammer mill for continuous grinding until it is drawn through an adjustable gate means which regulates material flow to the separation loop. A separation loop is provided which utilizes vacuum pressure means for removing paper, dust, and other fine materials and collecting them as waste, while reducing the overall dust level associated with such a device. Within the separation loop are located paper shredders to further reduce paper for removal.

The present invention is capable of controllably producing product within a much tighter range of grit sizes and more efficiently removing paper than possible with the prior art.

The foregoing and other objectives will become apparent from the following description of a preferred embodiment of the invention, which is given here by way of example, only with reference to the following drawings and which like reference devices referred to like parts thereof throughout the various views and diagrams.

BEST MODE FOR CARRYING OUT THE INVENTION

Figure 1:
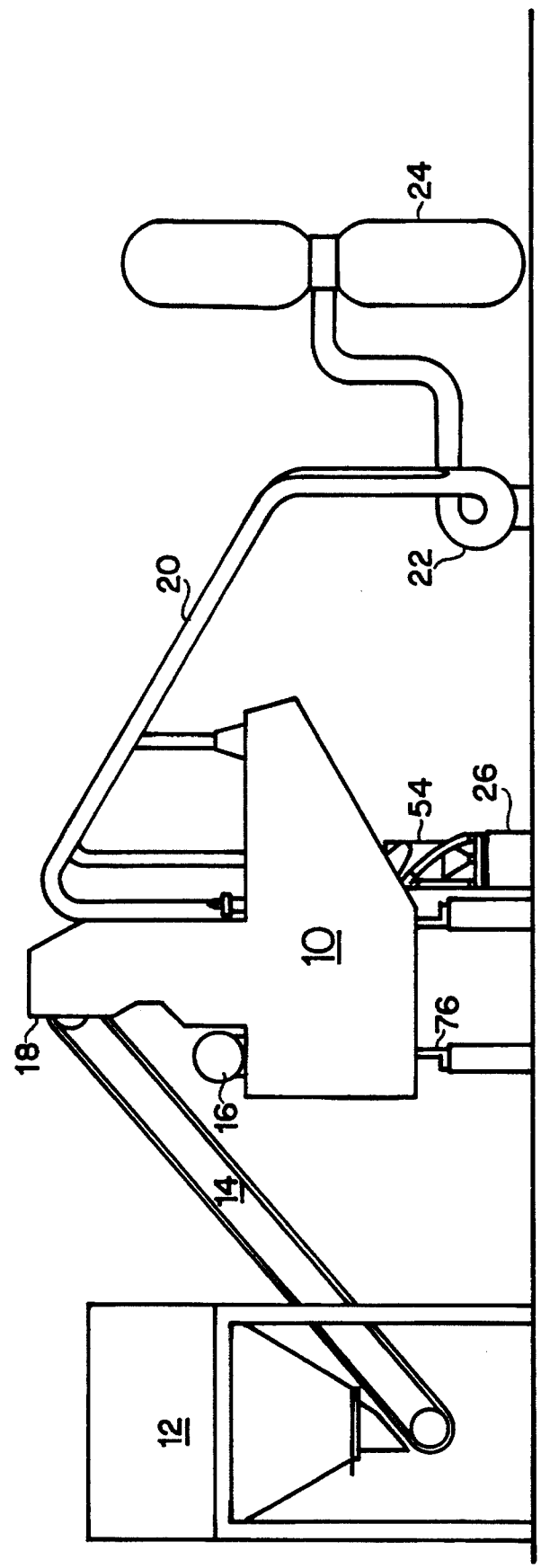
FIG. 1 is a side representational elevation view of a two stage hammer mill according to the present invention.

The present invention employs a two stage hammer mill which reduces raw materials (i.e., recycled glass and the associated contaminants) to small glass particles in the 100–800 grit size range and waste. Referring now to FIG. 1, glass grinder 10 is of light weight, modular construction, such that it may be taken apart, relocated, and restored to operation quickly and easily. The modular design also allows it to be easily cleaned and reconfigured to produce aggregate of selectable size.

The preferred embodiment as shown in FIG. 1 is generally characterized by a hopper 12, a conveyor 14, a glass grinding apparatus 10, and a vacuum collection and separation system comprising a motor/blower 22, an exhaust plenum 20, a cyclone separator 54, and a waste receptacle 24.

Figure 2:
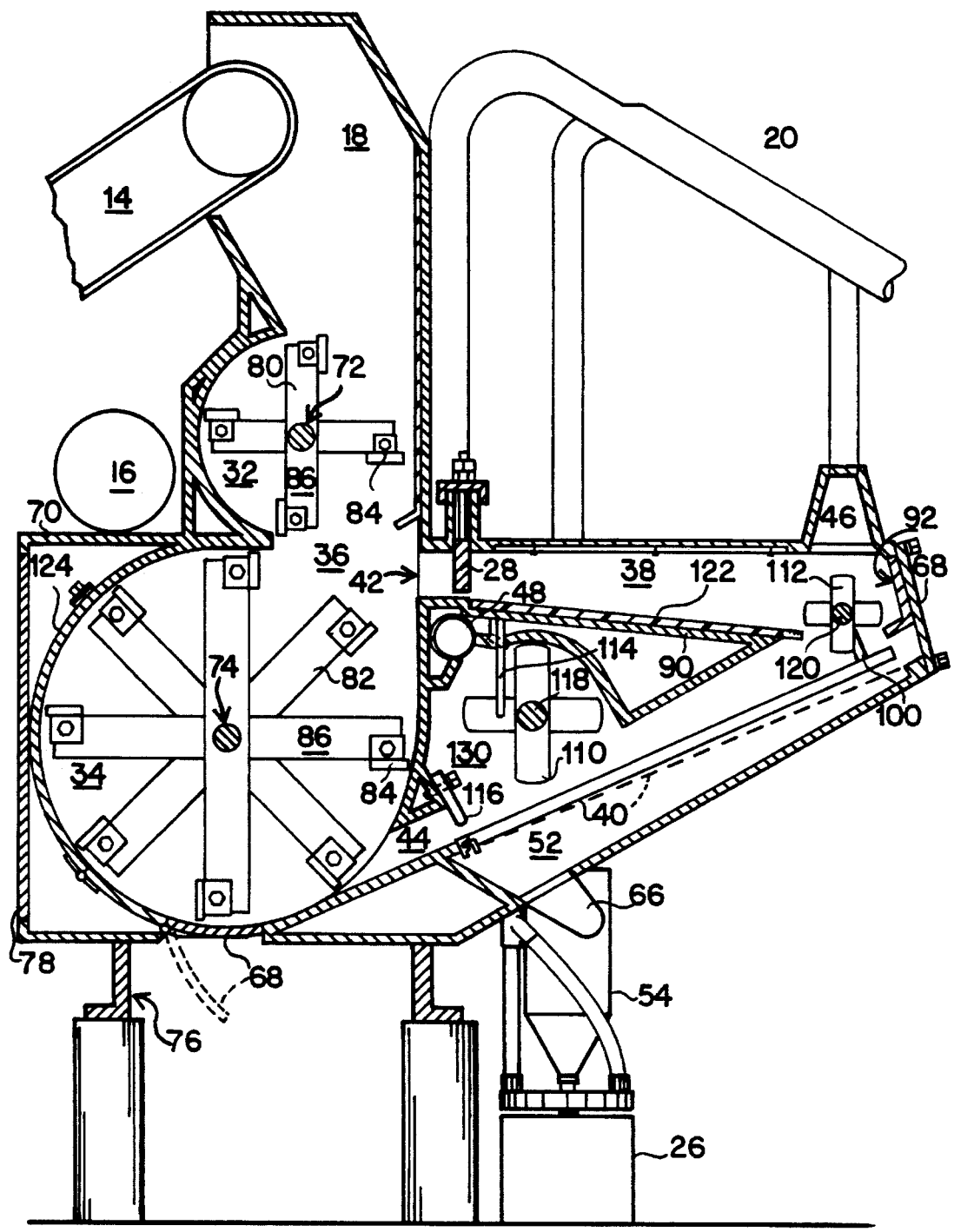
FIG. 2 is an enlarged side representational elevation view of the primary and secondary hammer mills and separation loop of the hammer mill shown in FIG. 1.

Referring now to FIG. 2, the glass grinding apparatus will be seen to comprise a frame body 70 with rigid side panels 78 supported by support legs 76 of sufficient length to allow for a product collector 26 to be located below glass grinder 10. Within the frame 70 and rigid side panels 78 are located the primary grinding chamber 32 and secondary grinding chamber 34 which are in pneumatic communication through opening 36. The primary grinding chamber 32 encloses the primary hammer mill rotor 72 which is mounted using bearings (not shown) and driven by motor 16. Recycled glass and air enter the primary grinding chamber 32 through the throat 18. The secondary grinding chamber 34 encloses the secondary hammer mill rotor 74 and is in pneumatic communication with the separation loop 38 through the separation loop inlet port 42, which incorporates an adjustable flow control gate valve 28, and separation loop return port 44, which also incorporates an adjustable flow gate 116.

The separation loop 38 is in pneumatic communication with the secondary grinding chamber 34 via the separation inlet port 42 and separation return port 44. Within the separation loop are located vacuum lift offs 46 and 48 which are in pneumatic communication with the exhaust plenum 20. Two shredding mechanisms 118 and 120 are located within the separation loop. Located within the lower half of the separation loop 38 are shaker screen 40 and collection baffle 52, which funnels product through duct 66 into cyclone separator 54.

The first stage hammer mill 80 consists of a plurality of hammers 84, here represented as bars, removably mounted on retaining members 86 and aligned axially parallel to the hammer mill rotor 72. The retaining members 86 are fixedly attached to the first stage hammer mill rotor which is supported by bearings (not shown). Approximately ½ inch of clearance is maintained between the hammers 84 and the primary hammer mill chamber 32. One end of the primary hammer mill rotor 72 extends beyond the rigid side panels 78 where it may be driven by any suitable means. It will be recognized that as the hammer mill rotor 72 rotates, the hammers 84 sweep a cylindrical volume with minimal clearance between the hammers 84 and the primary grinding chamber 32. The primary hammer mill rotor 72 is turned at approximately 1725 rpm, which has been found to be preferable, but can be rotated in the range of 200 rpm to 3500 rpm. For other applications, it may be preferable to vary the rotational speed of the primary hammer mill rotor 72 faster or slower, but for typical glass grinding applications these ranges have been found to be preferable.

The second stage hammer mill 34 of the present invention consists of a hammer mill assembly generally similar to the primary hammer mill assembly 32, although larger in diameter. The secondary hammer mill 82 is supported by a rotor 74 on bearings (not shown) and is provided with a plurality of hammers 84 removably mounted to retaining members 86. It is important to note that the second stage hammer mill rotor 74 rotates at a higher velocity, 3200 rpm, than the primary hammer mill rotor 72, 1725 rpm. The higher velocity provides for finer grinding and the increased air velocity required to entrain smaller particles.

The second stage hammer mill grinding chamber 34 is provided with inlet opening 36 through which coarsely ground material is drawn into the secondary grinding chamber 34 from the primary grinding chamber 32. It should be recognized that the means for conveying material is a combination of gravity, entrainment in the airflow, and impact with the primary hammer mill hammers 84. In this embodiment, eight, or more, separate hammers 84 are provided on four pair of separating members 86 for the primary hammer mill 80 and four hammers 84 on two separating members 86 are provided on the secondary hammer mill 82. The quantity of hammers in the grinding chambers 32 and 34 can be increased or decreased at the time of manufacture to achieve the desired material granularity. Each separating member 86 is fixedly attached to the respective rotor 72 and 74 which is driven by any suitable means. As in the primary grinding chamber 32, the separating members 86 rigidly hold the hammers 84 to a predetermined clearance of the annular secondary grinding chamber 34. Each hammer 84 is mounted parallel to the rotor 74 and is spaced radially equidistant with equal angular separation between each hammer 84. Also provided in the secondary grinding chamber 34 is a bottom clean out port 68. The clean out port 68 can be opened to remove built up material and perform maintenance on the hammer mill assembly. A side access panel 124 is provided to allow maintenance of the secondary hammer mill 82.

The secondary hammer mill chamber 34 is provided with two ports connecting it with the separation loop 38. The separation loop inlet port 42 allows product to enter the separation loop 38 from the secondary grinding chamber 34. At the separation loop inlet port 42 is located an adjustable flow gate 28 which adjusts the aperture through which material flows. The return passage from the separation loop 38 to the secondary grinding chamber 34 is the separation loop return port 44. At the separation loop return port 44 is located an adjustable flow gate 116. The separation loop inlet port 42 is located such that product must make at least one pass through the secondary grinding chamber 34 prior to entering the separation loop 38, ensuring at least an incremental amount of secondary grinding. The separation loop return port 44 is located such that returning material must make at least one half pass through the secondary grinding chamber 34 prior to reentering the separation loop 38.

The separation loop 38 is connected to the secondary grinding chamber 34 via the separation loop inlet 42 and return 44 ports. Entry into the separation loop 38 is through an adjustable gate valve 28 which controls the flow rate and thus particle size of materials entering the separation loop 38. Return to the secondary grinding chamber 34 is through an adjustable flow gate 116 which allows further refinement of the material flow.

Figure 3:
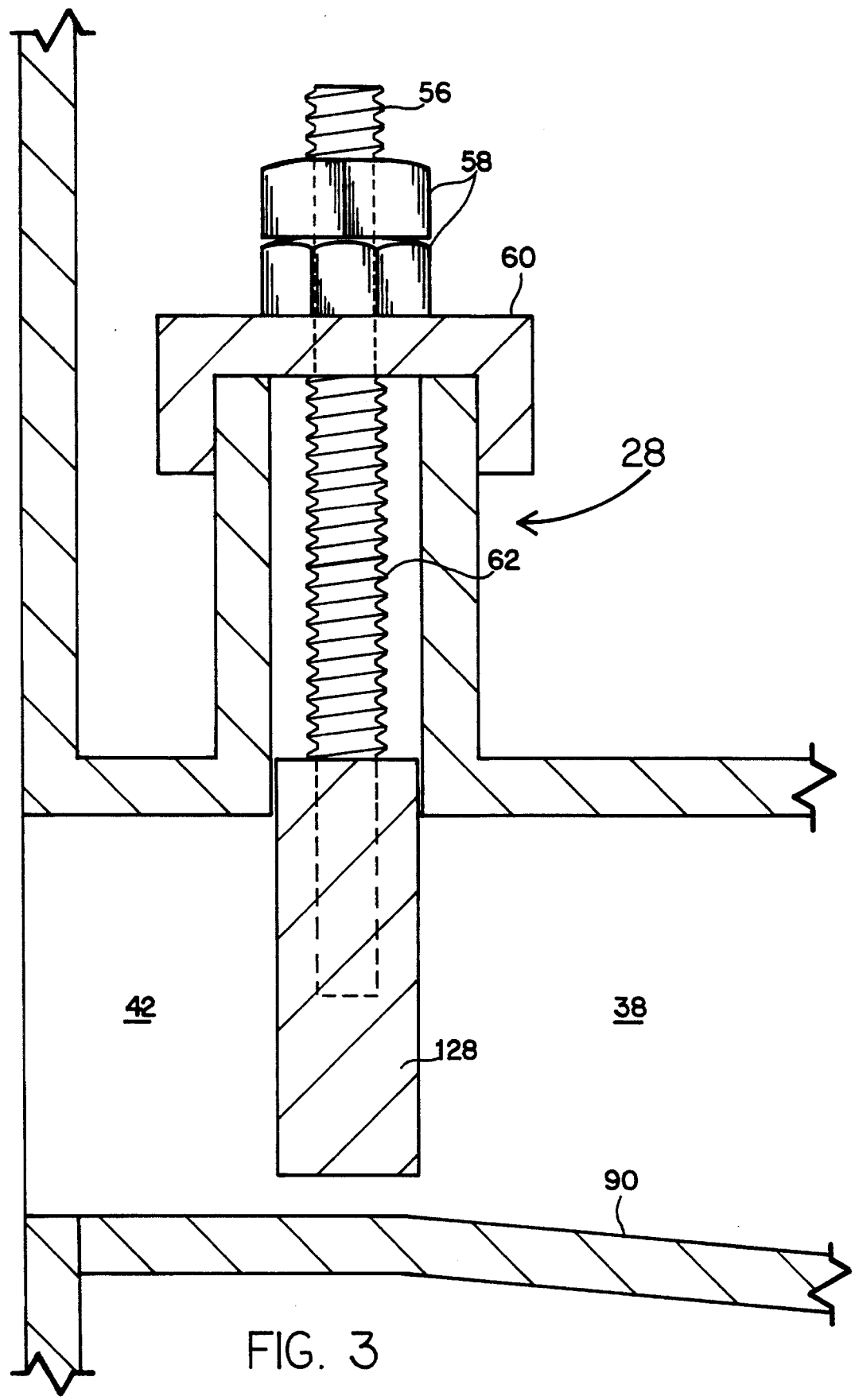
FIG. 3 is a cross sectional view of the adjustable flow gate.

Referring to FIG. 3, the adjustable flow gate 28 can be seen to comprise a solid bar 128 of sufficient height to completely block the separation loop inlet port 42 in the "closed" position. The bar 128 is vertically adjustable by means of a threaded rod 56 and fixed in position by means of nuts 58. A gate pocket 62 is provided with cap 60 such that the flow gate 28 may be raised vertically to the fully "open" or "closed" position or any position between the two extremes. It should be recognized that raising the flow gate 28 increases the aperture through the separation loop inlet port 42 and reduces the grinding provided in the secondary grinding chamber 34, thus providing for coarser product, while lowering the flow gate 28 reduces the aperture and increases the grinding in the secondary grinding chamber 34, resulting in finer product.

Referring to FIG. 2, the separation loop 38 incorporates an increasing cross sectional area and deflector plates for reducing the energy of the material entering the separation loop 38. Reducing the energy results in slowing the velocity of the product flow and allows larger grit material to fall from the product flow and be sized by the shaker screen 40. It should be recognized that the separation loop inlet port 42 corresponds to the top of the secondary grinding chamber 34 and the separation loop return port 44 corresponds to roughly the bottom of the secondary grinding chamber 34, thus gravity is partially utilized to move material through the separation loop 38.

Figure 6:
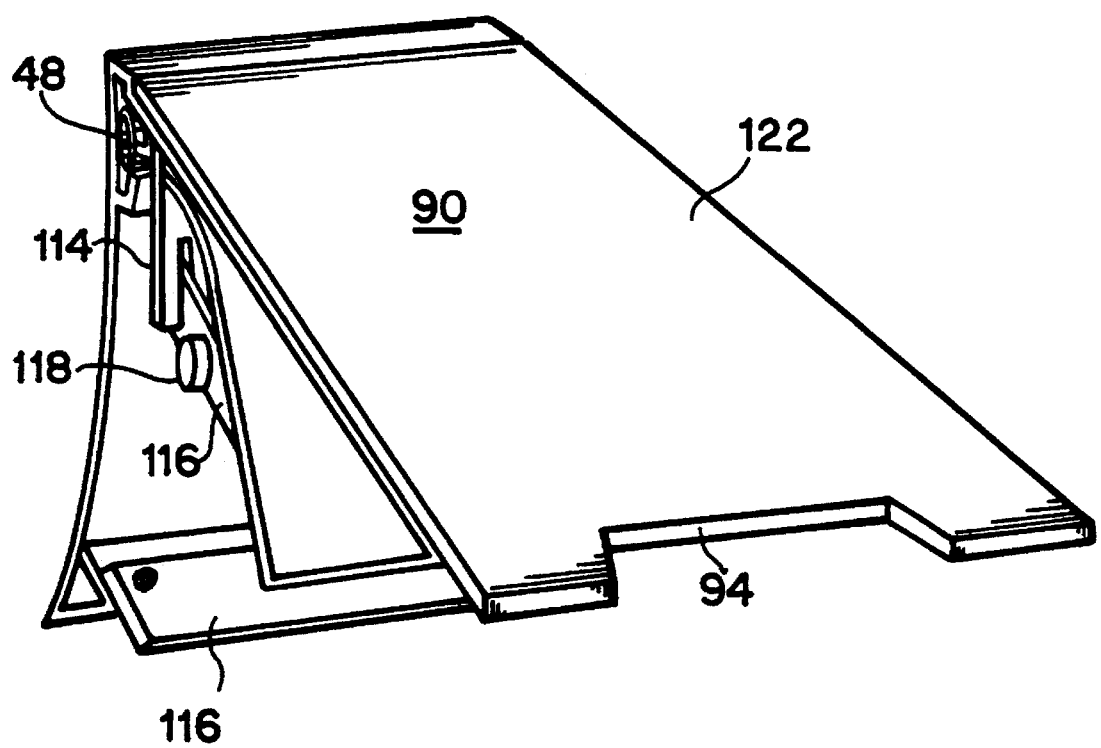
FIG. 6 is a perspective view of the internal structure of the separation loop emphasizing the notch out in the separation loop floor.

The internal structure of the separation loop 38 is significant. From the separation loop inlet port 42, the floor 90 of the passageway falls away from the horizontal, optimally between 20° and 30° rate of slope. Steeper or shallower slopes may be preferable for other applications. The floor 90 is also covered by a plastic slide 122 to reduce friction. The slope and reduced friction allow material to flow by both pneumatic and gravity means. Referring to FIG. 6, another significant aspect of the internal structure of the separation loop 38 is the notch 94 provided in the separation loop floor 90. An unexpected result that has been discovered by experimentation is that providing a notch 94 greatly enhances product flow and eliminates build up of product at the edge of the separation loop floor 90. Both the slope of the separation loop floor 90 and the notch 94 provide increasing cross-sectional area, which reduces the air and material velocity allowing larger grit particles to drop from the flow and be sorted by the shaker screen assembly 40.

Figure 7:
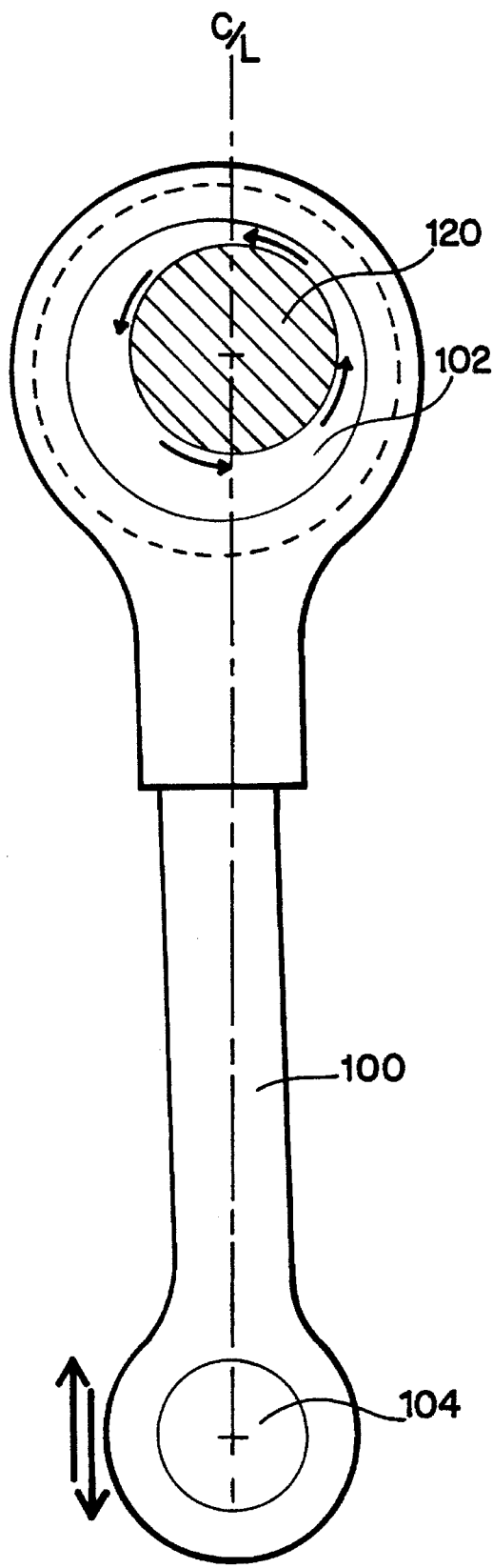
FIG. 7 is a representational view of the driving mechanism for the shaker screen.

Referring to FIG. 2, located in the separation loop 38 are the primary paper shredder 110 and secondary paper shredder 112. The primary paper shredder 110 consists of a plurality of blades mounted upon rotor 118 mounted in bearings (not shown). The blades of the primary shredder 110 pass through tines 114 to enhance shredding of paper. The primary paper shredder is located in a cavity 130 beneath the floor of the separation loop 90. By experimentation it has been found that paper collects in this cavity and can be efficiently shredded by the primary paper shredder 110 for removal by the secondary vacuum liftoff 48. The flow through the cavity 130 wherein the primary paper shredder is located can be adjusted via adjustable flow control gate 116. Both paper shredders 110 and 112 are driven by motor means, not shown. The secondary paper shredder 112 is located near the top of the shaker screen 40. The secondary paper shredder 112 also consists of a number of blades mounted upon rotor 120. These paper shredders rotate at approximately 200 rpm. The secondary paper shredder 112 is linked to the shaker screen assembly 40. Referring to FIG. 7, a connecting rod 100 translates the rotational motion of the secondary paper shredder rotor 120 to vibrating motion of the shaker screen 40. Connecting rod 100 connects the shaker screen 40 via connecting pin 104 to the secondary paper shredder rotor 120 through eccentric bearing 102 in order to translate rotational motion into vertical displacement in the shaker screen 40. The 200 revolutions per minute of the paper shredder rotor is translated into approximately a 3.3 hertz vibration in the shaker screen assembly 40. Depending upon the application, this frequency could be increased or decreased to optimize the performance of the system.

Referring to FIG. 2, located in the separation loop 38 are the primary vacuum lift off 46 and secondary vacuum lift off 48. The primary vacuum lift off 46 draws air from around the secondary paper shredder 110, drawing paper and dust from the flow stream. It should be recognized that the primary lift off 46, secondary lift off 48, and cyclone separator 54 draw material into the separation loop through the adjustable flow control gate 28 and remove air from the separation loop 38 by means of vacuum pressure. The combination of air pressure created by the rotation of the secondary hammer mill 34, the vacuum lift offs 46, 48, and cyclone separator 54 produce a pressure differential across the flow control gate 28, which draws material from the entrained flow of the secondary hammer mill 34 into the separation loop 38.

Midway through the separation loop, product flow is reversed by means of deflector plates 92 which provide further reduction in material velocity and energy. Located at this point in the separation loop 38 is the notch 94 in the internal structure of the separation loop 38, the secondary paper shredder 112, and the primary vacuum lift off 46. The secondary vacuum lift off 48 removes additional air, dust and paper from the material flow stream.

Figure 4:
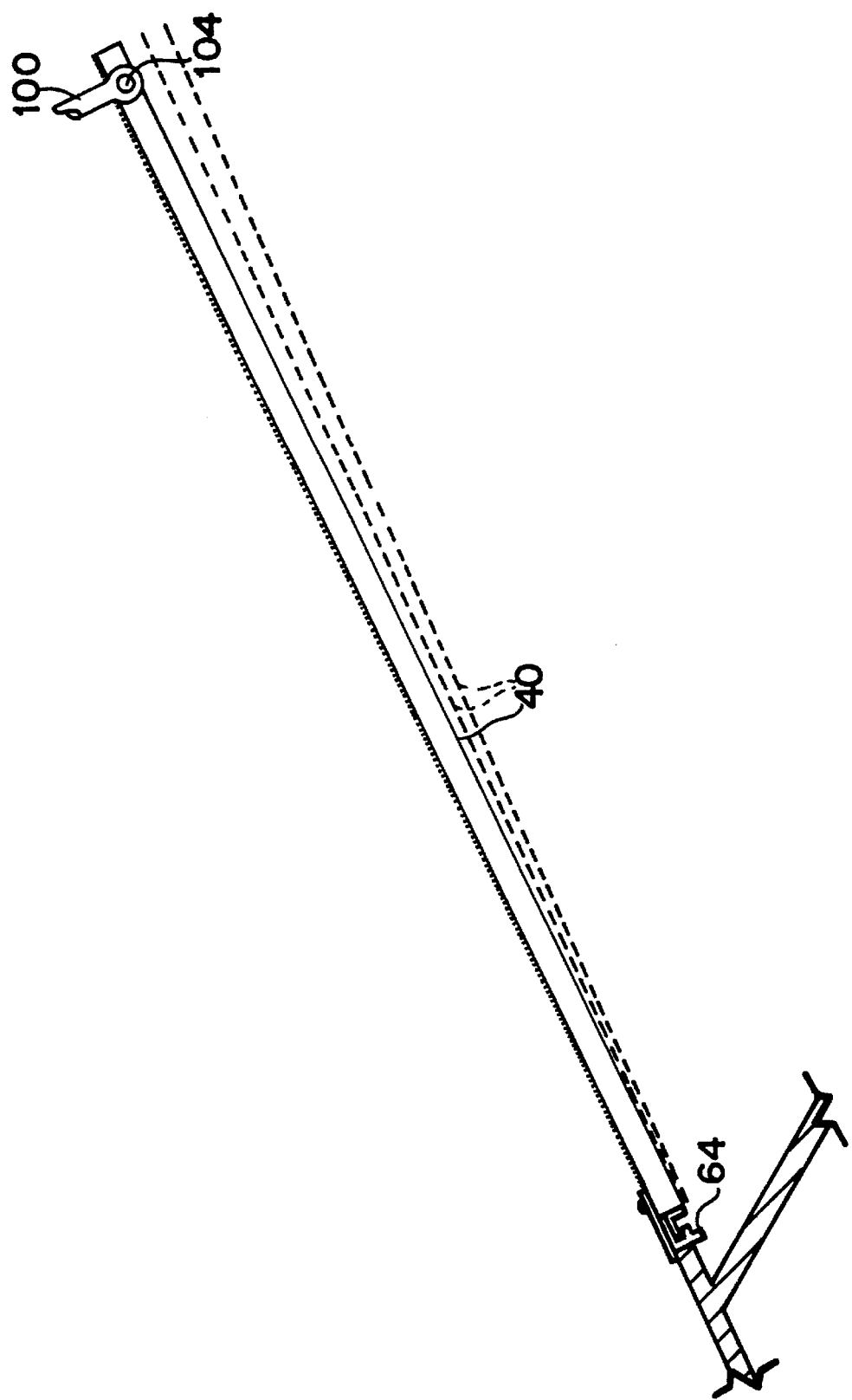
FIG. 4 is a cross sectional view of the shaker screen assembly.

Below the upper portion of the separation loop 38 is mounted the vibrating shaker screen 40. The shaker screen 40 is installed at a 30°–40° angle from the vertical to enhance product flow. Steeper or shallower angles may be preferred depending upon the application. The shaker screen 40 is removable for ease of cleaning and replacement to allow for quick change of the output aggregate product size. Different shaker screens 40, in combination with adjustments in the flow control gate valve 28 and 116, allow the system to quickly be reconfigured to optimize aggregate output sizes and mass flow rates. Referring to FIG. 4, the shaker screen 40 is held in at the bottom by a tongue and groove arrangement 64 to facilitate quick removal and cleaning. The shaker screen 40 may be configured with holes of various sizes, shapes and perforation patterns optimized for various materials and product sizes. The shaker screen 40 is forcibly agitated in the vertical direction by connecting rod 100 and is enclosed by a collection tray 52. The collection tray 52 funnels crushed material to a duct 66 which is connected pneumatically and gravitationally to the cyclone separator 54.

Located in the cavity 130 of the return separation loop 34 at the end of the shaker tray 40 is the secondary vacuum lift off 48. The secondary vacuum lift off 48 is in pneumatic communication with the separation loop 34 and exhaust plenum 20 and draws dust and paper from the material flow stream. The secondary vacuum lift off 48 merges with the primary 46 in the exhaust plenum 20. Material passing the shaker screen 40 and the secondary lift off 48 returns to the secondary grinding chamber 34 via the separation loop return port 44.

The primary 46 and secondary 48 vacuum lift offs are each in pneumatic communication with the separation loop 34. Each vacuum lift off removes air, entraining the lightest particles, i.e., dust and paper, from the flow stream. Forcibly removing air from the separation loop greatly reduces the dust associated with operating the hammer mill 10 and reduces clogging of the shaker screen 40, thus increasing throughput and efficiency. The vacuum lift off means remove the lightest particles in a similar manner in the cyclone separator. Each of the lift off mechanisms incorporates an opening to the separation loop followed by a chamber of larger cross sectional area, providing decreased flow velocity whereby larger particles fall, by gravity, back into the separation loop for further processing and light particles, dust and paper, are removed. The vacuum lift off manifold 20 is driven by a motor/blower 22 of suitable size to provide sufficient mass flow to remove the desired quantities of particulate and deposit them in waste collection receptacles 24. It should be noted that the ducts in the exhaust plenum are inclined to reduce particle buildup.

Figure 5:
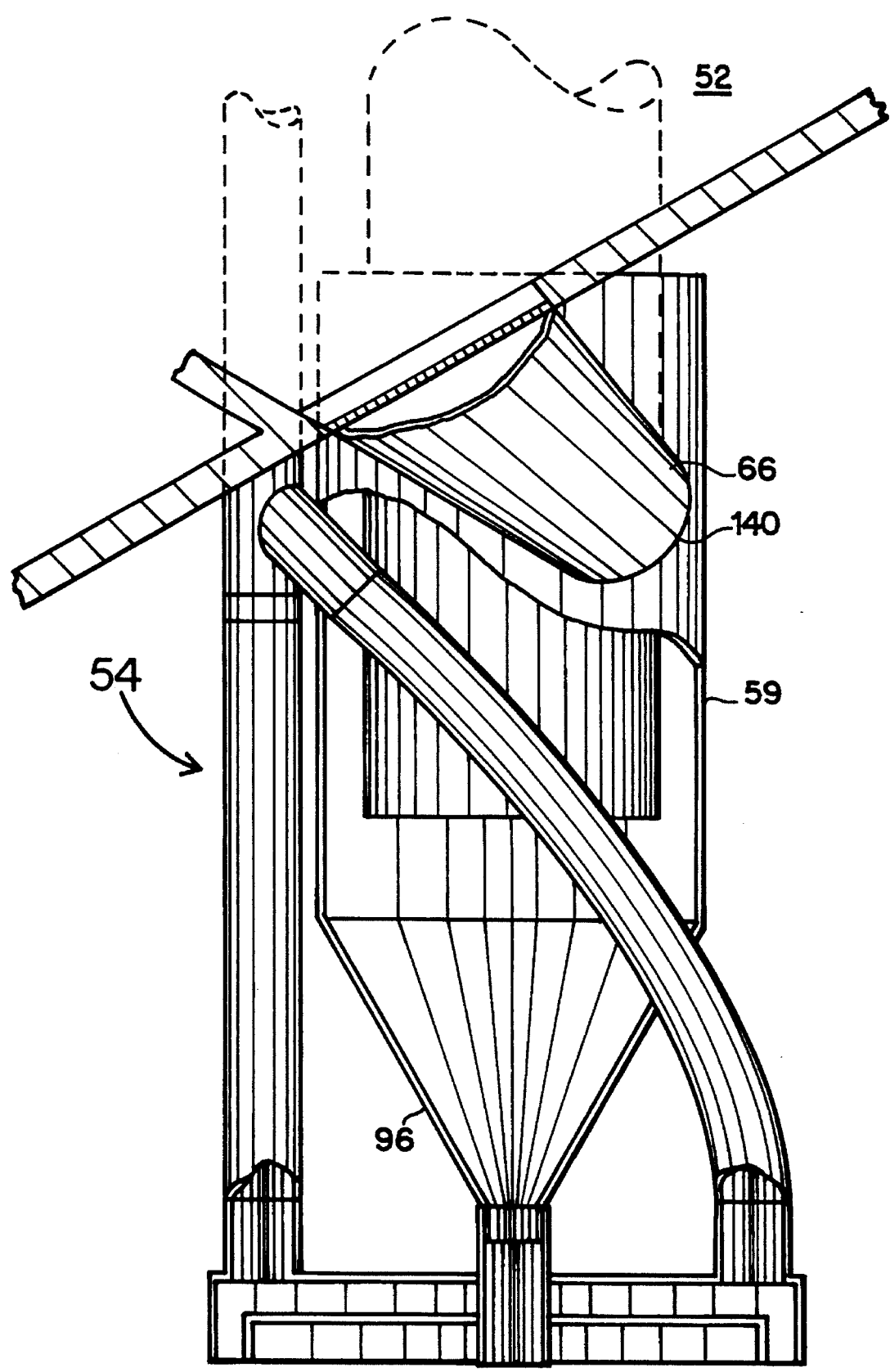
FIG. 5 is a side representational view of a cyclone separator.

Referring to FIG. 5, the cyclone separator 54 is of similar design to other cyclone separators found in the prior art. The inlet 140 to the cyclone separator is connected pneumatically and gravitationally by means of a duct 66 to the collection tray 52 below the shaker screen 40. The separator 54 consists of a diverging cone 96 through which ground material is deposited at the top and air is counter flowed from the bottom to the top. As the air swirls through the separator 54, the centrifugal action further removes dust and small particles from the aggregate product providing for much cleaner output than possible with the prior art.

In operation, recycled glass is loaded into a hopper 12 which meters recycled bottles onto a conveyor belt 14. At this stage, the recycled glass includes whole bottles and glass fragments of various sizes including labels. The conveyor belt 14 transports the glass from the hopper 12 to the throat 18 of the glass grinder 10. At the top of the conveyor 14, the glass is dumped into the throat 18 and is funneled into the first stage 32 of a two stage hammer mill via gravity.

The first stage hammer mill 32 provides coarse grinding of the raw material by means of a rotating paddle wheel system comprising hammers 84, a rotor 72 and retaining members 86 all located within the grinding chamber 32. Incoming material is shattered by impact with the hammers 84, and a portion of the incoming material is entrained in the primary grinding chamber 32. In the present embodiment the primary hammer mill 80 rotates at approximately 1725 rpm, sufficient velocity to draw air into the hammer mill 80 and entrained material in the paddle wheel system. Material is ground by impact and is further ground by repeated impacts with the grinding chamber walls as well as incoming raw material.

From the first stage hammer mill 80, the coarsely ground glass and contaminants are accelerated into the second stage hammer mill 82 by means of entrainment, impact and gravity. The second stage hammer mill 82 is also of a paddle wheel configuration, but operates at a higher speed, 3500 rpm, than the primary stage hammer mill 81. These high rotational velocities allow large quantities of glass to be processed quickly and produce significant air flow. In a manner identical to the primary hammer mill 80, the glass is further ground by impact and entrained in the secondary hammer mill 82. This slurry of glass and particulates is entrained in the paddle wheel system and is accelerated to a high velocity until the particles are either centrifugally thrown through or are pneumatically drawn into the separation loop 38 through the adjustable flow gate 28.

The adjustable flow gate at the top 28 and bottom 116 of the separation loop are raised or lowered to restrict the flow of raw material into the separation loop 38 and thus control the aggregate grit size of the product. In the present embodiment, typical grit sizes range from 100 –800 grit, however a large range of other grit sizes are possible. Raising the gate 28 increases the size of the aperture through which particles may pass into the separation loop 38, and in combination with a suitable shaker screen 40 provide coarser grinding, while lowering the gate 28 reduces the opening, causing the material to cycle longer in the secondary grinding chamber 34, and using a suitable shaker screen 40, produces finer grinding.

Material passing through the separation loop 38 is subjected to two vacuum liftoff systems, the primary 46 and secondary 48. The vacuum lift offs 46 and 48 provide two important functions. First, the vacuum system 20 draws air from the separation loop 38, and in combination with the entrained flow in the secondary grinding chamber 34, induces a pressure differential across the adjustable flow control gate 28. This pressure differential draws dust and particles from the material flow stream into the secondary grinding chamber 34. The second important function is to extract the lightest particles, typically very finely ground glass and dust, but most importantly, paper, to reduce clogging in the shaker screen and reduce particle build-up in "dead" spots within the system. The cyclone mass separator 54 also separates the lightest particles (paper) from the heavier glass product. The net effect is to produce a "clean" product of uniform aggregate size. In the present invention, two vacuum liftoff points are employed, however depending upon the size, internal structure, and application more or fewer lift-offs can be employed. For the present invention, two have been found to perform optimally.

As the ground particles are passed through the separation loop 38, the heavier particles, glass of varying grit sizes, fall from the particle stream due to gravity and collect on the separation loop floor 90 or are bounced off of the various deflectors 92 before being passed across a shaker screen 40.

By experimentation, the notch 94 in the separation loop floor 90 has been found to greatly reduce build up of glass particles and improve throughput. The shaker screen 40 is forcibly agitated to improve particle movement across the shaker screen 40. The shaker screen 40 selectively passes particles of less than a specified size through to the collection baffle 52. Particles which do not pass through the shaker screen 40 or are not lifted off by one of the vacuum lift offs 46 or 48 are reintroduced to the secondary grinding chamber 34 for further grinding. Particles that pass through the shaker screen 40 are funneled by the collection baffle 52 to a duct 66 which transports the glass to the cyclone separator 54.

In the cyclone separator 54, the glass is fed into the top of a diverging cone 96. Air is drawn in through the bottom of the cone, counter to the flow of the incoming glass. As the glass falls through the base of the cone due to gravity, the smallest and lightest particles are drawn out and sucked into the exhaust plenum 20. The cyclone separator 54 shown also includes lip exhaust whereby vacuum pressure is used to ensure that dust does not escape from around the edge of the flange mating the cyclone separator 54 and the product collector 26. This lip exhaust is not a required element, but is useful for controlling the dust associated with operating such an apparatus.

The exhaust plenum 20 is driven by a motor/blower combination 22 of suitable size. The blower 22 draws air from the plenum, providing vacuum pressure for the operation of the primary 56 and secondary 58 vacuum lift offs, as well as the cyclone separator 54. On the high pressure side of the blower is located a waste receptacle 24 of typical industrial use. These receptacles utilize a porous fabric to strain dust and debris from the air flow and collect the material in a suitable container 24. Other forms of separation could be provided at this stage, or no collection whatsoever, depending upon the application.

While there is shown and described the present preferred embodiment of the invention, it is to be distinctly understood that this invention is not limited thereto but may be variously embodied to practice within the scope of the following claims.

I claim:

1. An apparatus for grinding a mixture of glass and contaminants and separating ground glass from contaminants which comprises:

means for introducing glass and contaminants into a glass grinding chamber;

a glass grinding chamber, operatively connected to said means for introducing glass and contaminants, for receiving glass and contaminants from said means for introducing glass and contaminants, said glass grinding chamber having a hammer mill therein including a plurality of rotating radially disposed members for impacting, entraining in air, and grinding, glass and contaminants;

a separation chamber having an inlet port, a separation loop and a return port, with said inlet port in pneumatic communication with the glass grinding chamber at a predetermined upper elevation, for receiving centrifugally thrown ground glass and contaminants, entrained in air, from the glass grinding chamber and into the separation loop, and with said return port connected to said glass grinding chamber, at a lower elevation for returning ground glass and contaminants, of larger than a predetermined size, from the separation loop to said glass grinding chamber for further grinding;

means for controlling the rate of flow of entrained ground glass and contaminants from the glass grinding chamber into the separation chamber;

means for reducing the velocity of entrained ground glass and contaminants to allow larger particles of ground glass and contaminants to fall out of air entrainment within the separation loop and onto a shaker screen;

a vacuum lift off being operatively positioned within the separation chamber to remove a portion of the air entrained ground contaminants from within the separation loop;

means for shredding entrained contaminants within the separation loop;

a shaker screen assembly being attached to the separation chamber and positioned to receive ground glass and contaminants falling out of entrainment within the separation loop, said assembly having a vibratable shaker screen for passing ground glass and contaminants smaller than a predetermined size through the shaker screen assembly; and a cyclone separator, being positioned to receive ground glass and contaminants passed through the shaker assembly, for separating the contaminants from the ground glass.

2. The apparatus of claim 1 wherein means for reducing the velocity of entrained ground glass and contaminants to allow larger particles of ground glass and contaminants to fall out of air entrainment within the separation loop and onto the shaker screen further comprising configuring the separation loop into a first passageway for flow of entrained ground glass and contaminants in a predetermined first direction, means for deflecting the flow of entrained ground glass and contaminants into a second downwardly sloping passageway in a second direction for flow, by gravity and by air entrainment, of ground glass and contaminants in a second direction.

3. The apparatus of claim 2 wherein means for controlling the rate of flow of entrained ground glass and contaminants from the glass grinding chamber into the separation chamber further comprising an adjustable gate valve operatively connected to the inlet port of the separation chamber.

4. The apparatus of claim 1 wherein means for controlling the rate of flow of entrained ground glass and contaminants from the glass grinder chamber into the separation chamber further comprises an adjustable gate valve operatively connected to the inlet port of the separation chamber.

5. The apparatus of claim 1 wherein the means for shredding entrained contaminants within the separation loop further comprises a paper shredder having a plurality of radially disposed rotating blades for cutting paper entrained in air.

6. The apparatus of claim 1 which further comprises a first hammer mill grinding chamber operatively interconnected between the means for introducing glass and contaminants into a glass grinding chamber and the glass grinding chamber for first receiving and grinding glass and contaminants and depositing them into the glass grinding chamber.

* * * * *